United States Patent
Kramer et al.

(10) Patent No.: US 6,797,934 B2
(45) Date of Patent: Sep. 28, 2004

(54) OPTICAL TRANSIENT SENSOR HAVING A CHARGE/DISCHARGE CIRCUIT

(75) Inventors: Jörg Kramer, Zürich (CH); Rahul Sarpeshkar, Arlington, MA (US)

(73) Assignees: Eidgenossische Technische Hochschule Zurich, Zurich (CH); Universitat Zurich, Zurich (CH)

( * ) Notice: Subject to any disclaimer, the term of this patent is extended or adjusted under 35 U.S.C. 154(b) by 249 days.

(21) Appl. No.: 10/154,514

(22) Filed: May 23, 2002

(65) Prior Publication Data

US 2003/0218118 A1 Nov. 27, 2003

(51) Int. Cl.[7] .............................................. H01L 31/00
(52) U.S. Cl. ................. 250/214.1; 250/214 A
(58) Field of Search ........................ 250/214.1, 214 A, 250/214 R; 257/290, 291

(56) References Cited

U.S. PATENT DOCUMENTS 4,384,216 A * 5/1983 Pricer ........................ 326/88

* cited by examiner

Primary Examiner—Que T. Le
(74) Attorney, Agent, or Firm—Donald S. Dowden; Cooper & Dunham LLP

(57) ABSTRACT

An optical transient sensor circuit includes a photodiode in series with a MOS feedback transistor connected across a voltage difference. An inverting amplifier having its input connected to the common connection between the photodiode and the MOS feedback transistor and its output connected to an output-node for a measure of the incoming irradiance. A charge/discharge circuit, having an input connected to the output of the inverting amplifier, having an output connected to the gate of the MOS feedback transistor and having a first and second output for half-wave rectified and thresholded contrast encoding measures of positive and negative irradiance transients. A capacitor connected between a constant potential and the gate of the MOS feedback transistor.

20 Claims, 3 Drawing Sheets

OPTICAL TRANSIENT SENSOR HAVING A CHARGE/DISCHARGE CIRCUIT

BACKGROUND OF THE INVENTION

1. Field of the Invention

Figure 1:
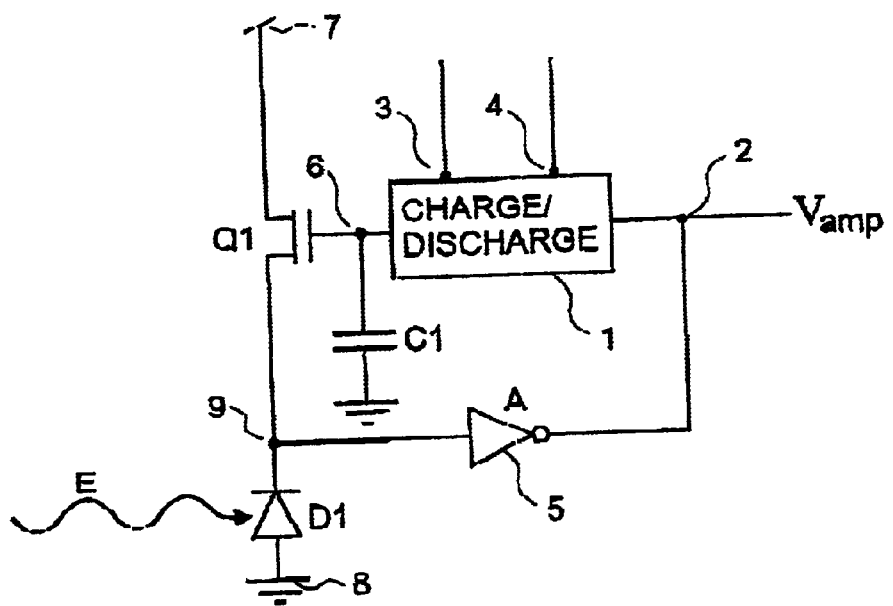

The present invention relates to an optical transient sensor. More particularly it relates to an electronic circuit designed to detect changes in an optical parameter to be measured.

2. Background Art

Semiconductor optical sensors are known in the art. The precursor for the present invention are the adaptive photoreceptors described in U.S. Pat. No. 5,376,813. The sensors in U.S. Pat. No. 5,376,813 do not provide a temporal derivative output. Known implementations of sensors with temporal derivative output usually use multiple stage feedforward structures to obtain the different outputs. These sensors have at least two disadvantages including a high transistor count and a high power consumption.

BRIEF SUMMARY OF THE INVENTION

Hence, it is a general object of the invention to provide an optical sensor which has a compact size and a low power consumption and provides a plurality of different output signals.

Now, in order to implement these and still further objects of the invention, which will become more readily apparent as the description proceeds, the optical transient sensor according to the invention is manifested by the features that it comprises a feedback transistor of a first conductivity type, having a first source-drain region connected to a source of a first voltage potential, a gate and a second source-drain region; a photodiode having a first terminal connected to said second source-drain region of said feedback transistor and a second terminal connected to a source of a second voltage potential, said photodiode oriented so as to be reversed biased with respect to said sources of first and second voltage potential; an amplifier having an input connected to said first terminal of said photodiode and an output connected to an output node; a charge/discharge circuit having an input connected to said output node, a main output connected to the gate of said feedback transistor and at least one signal output for a signal indicative of transitions; a first capacitor having a first plate connected to said main output of said charge/discharge circuit and a second plate connected to a constant voltage potential.

In yet another aspect, the invention relates to an optical transient sensor comprising a feedback transistor; a light sensitive element connected in series to said feedback transistor; an amplifier having an input connected to an input node between said feedback transistor and said light sensitive element and having an output connected to an output node; a charge/discharge circuit having an input connected to said output node, a main output connected to a capacitive load and a gate of said feedback transistor and at least one output indicative of a current for charging or discharging said capacitive load.

BRIEF DESCRIPTION OP THE DRAWINGS

Figure 2:
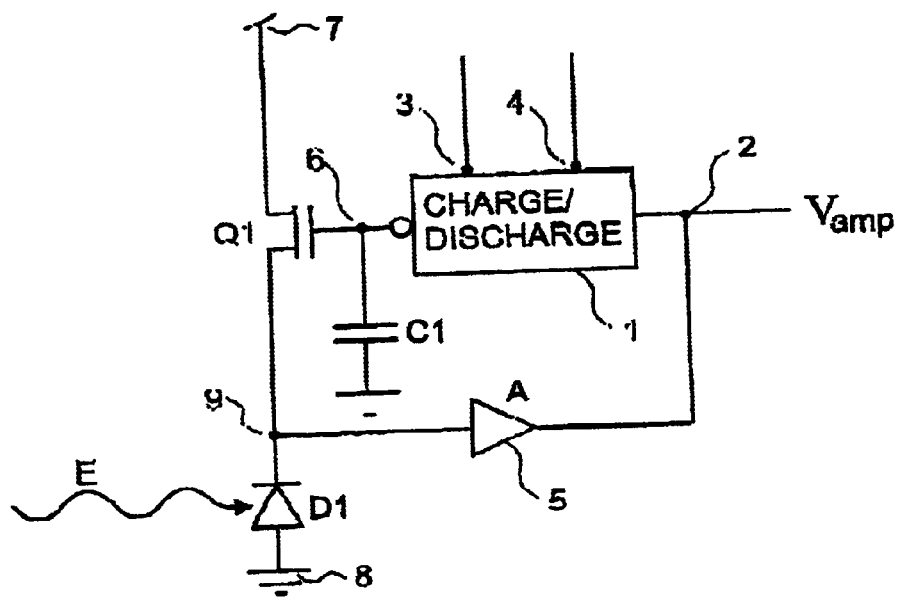
Figure 3:
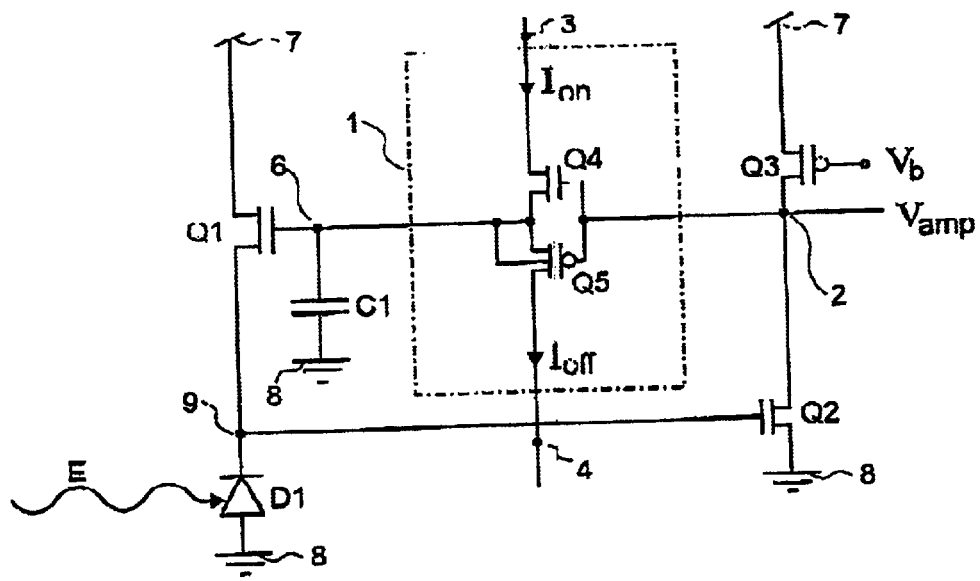
Figure 4:
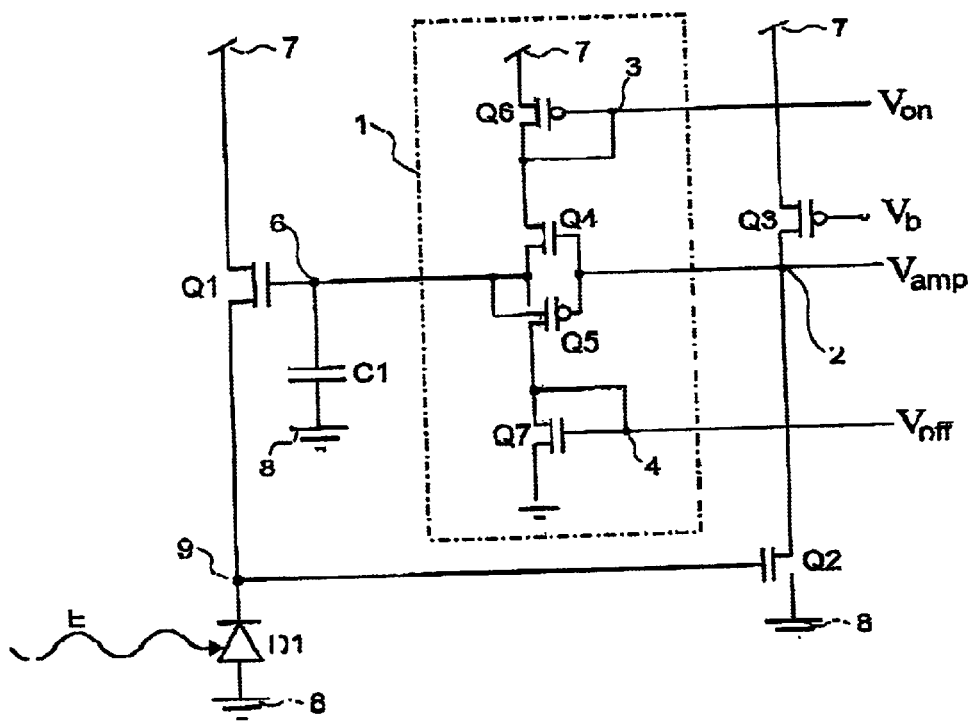
Figure 5:
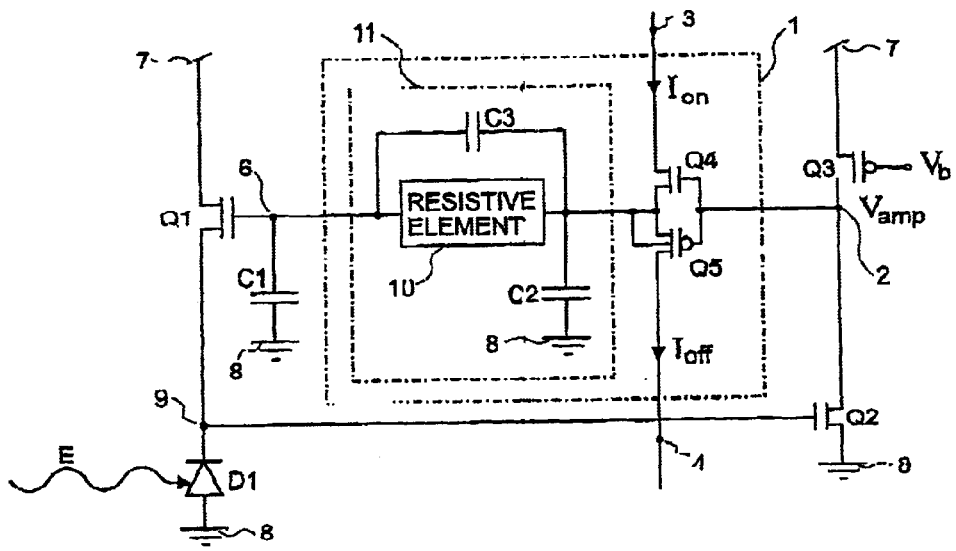
Figure 6:
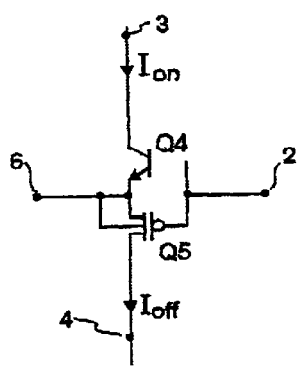
Figure 7:
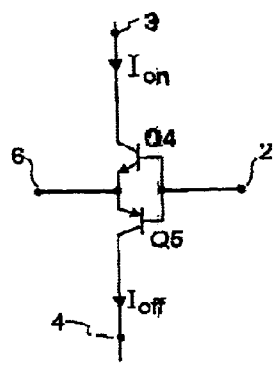
Figure 8:
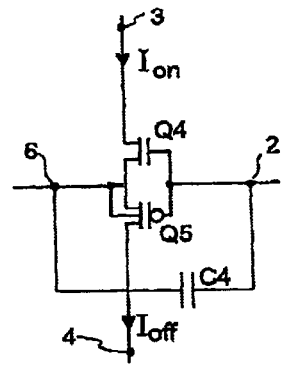

The invention will be better understood and objects other than those set forth above will become apparent when consideration is given to the following detailed description thereof. Such description makes reference to the annexed drawings, wherein:

FIG. 1 is a schematic diagram of an optical transient sensor circuit according to the invention with an inverting amplifier and a charge/discharge circuit, FIG. 2 is a schematic diagram of an optical transient sensor circuit according to the invention with an amplifier and an inverting charge/discharge circuit, FIG. 3 is a schematic diagram of an optical transient sensor circuit according to the invention, wherein the transient-outputs are current-based, FIG. 4 is a schematic diagram of an optical transient sensor circuit according to the invention, wherein the transient-outputs are voltage-based, FIG. 5 is a schematic diagram an optical transient sensor circuit according to the invention, wherein the charge/discharge circuit comprises two stages, FIG. 6 is a schematic diagram of a charge/discharge circuit implemented in BiCMOS technology, FIG. 7 is a schematic diagram of a charge/discharge circuit implemented in bipolar technology, FIG. 8 is a schematic diagram of a charge/discharge circuit comprising an additional capacitor.

DETAILED DESCRIPTION OF THE INVENTION

In the following the circuits according to the invention are primarily described for an implementation in a CMOS technology, but those of ordinary skill in the art will realize that the same circuits can also be implemented in a BiCMOS or Bipolar technology. If Bipolar transistors are used instead of MOS transistors the terms "source", "gate" and "drain" in the present document have to be replaced by the corresponding terms "emitter", "base" and "collector".

The circuits described in the following can also be implemented using transistors with opposite conductivity type, N-channel instead of P-channel and vice versa.

In the present document the circuits according to the invention comprise sources of a first and a second voltage potential. These can be seen as a common power supply. As well known to persons skilled in the art, different parts of the present circuits can also have different power supplies. Therefore the sources of the first or the second potential at certain nodes can be replaced by sources of further potentials without substantially affecting the functionality of the sensor.

In the present document the terms "low-high" and "high-low" are used to identify signal transitions with different signs, corresponding to positive and negative transients respectively. The transient channel are substantially independent of the absolute light intensity. Therefore "low-high" also stands for "high very high" or "very low-low" etc. In other documents the terms "ON-transitions" and "OFF-transitions" are also used instead of "low-high transitions" and "high-low transitions".

Referring first to FIG. 1, a schematic diagram of an optical transient sensor semiconductor circuit according to the invention in shown. The optical transient sensor of the present invention is useful for detection of changes in optical irradiance, which can for example he caused by motion within a sensed image. If an edge or the projected image of an edge passes the sensor, a sudden change of the incoming irradiance is detected and is signaled at the outputs 3, 4 of the circuit.

The optical transient sensor circuit of the present invention includes a photodiode D1 and an N-channel MOS feedback transistor Q1. Photodiode D1 is in series with N-channel MOS feedback transistor Q1 having its drain connected to a source of a first potential 7 and its source connected to the n region of photodiode D1. The p-region of photodiode D1 is connected to a source of a second potential 8, shown as a ground potential in FIG. 1. The first potential is higher than the second potential. The photodiode D1 is therefore reverse biased with respect to said first and second voltage potential. A typical potential difference between first and second potentials is 5 volts, but those of ordinary skill in the art will realize that the potential difference could be from about 1 to 6 volts. The n-region of photodiode D1 is connected to the input of an inverting amplifier 5. The inverting amplifier 5 has a high gain A. The output of the inverting amplifier b is connected to the input of a charge/discharge circuit 1. The charge/discharge circuit 1 comprises a first signal output 3 and a second signal output 4. The first signal output 3 is for low high transitions. It provides a half-wave rectified contrast encoding measure of positive irradiance transients. The second signal output 4 is for high-low transitions. It provides a half-wave rectified contrast encoding measure of negative irradiance transients. The main output of the charge/discharge circuit 1 is connoted to the gate of N-channel MOS feedback transistor Q1. A first capacitor or capacitive load C1 is connected between the gate of N-chancel MOS feedback transistor Q1 and a source of a constant potential, shown ac a ground potential in FIG. 1.

Light shining on the optical transient sensor generates a photocurrent in photodiode D1, which is linearly proportional to the intensity of light. The inverting amplifier, the charge/discharge circuit and the N-Channel MOS feedback transistor Q1 form a feedback loop.

The effect of a change of the intensity of light can be followed around the loop. An increase of light decreases the resistance of photodiode D1. As a result the voltage of node 9 will be lower and the output voltage $V_{amp}$ of the inverting amplifier will be higher. Consequently there is now a voltage difference between the gate-potential of the N-Channel MOS feedback transistor Q1 and the input of the charge/discharge circuit 1. Whenever there is such difference, the charge/discharge circuit 1 charges capacitor C1 until input-node 2 and output-node 6 of the charge/discharge circuit 1 have the same potential. A measure of the charging current is provided by signal output 3 of the charge/discharge circuit. Accordingly, if there is a decrease of light, the capacitor C1 has to be discharged and a measure of the discharging current is provided by signal output 4. The signal outputs 3 and 4 are thresholded. Therefore a certain minimal charging or discharging current must be exceeded for a response at the signal output. The shown charge/discharge circuit 1 has two separate output channels 3, 4 for positive and negative transients. An implementation with only one of these outputs or with one combined transient output channel is also possible.

The amplifier and the charge/discharge-circuit are preferably insensitive to light.

The optical transient sensor circuit may be fabricated using conventional CMOS technology. This allows the circuit or arrays comprising multiple such circuits to be fabricated highly integrated, in large quantities and at a low price.

Instead of the photodiode D1 other light sensitive elements can be used. These are for example phototransistors, photoconductors or photogates. Even though the present invention is mainly directed to optical sensors, the circuit according to the invention also be used for other types of sensors or even with signal sources other than a sensor.

Referring now to FIG. 2, a schematic diagram of an optical transient sensor semiconductor circuit according to the invention is shown. In contrast to the circuit of FIG. 1, the amplifier 5 is non-inverting. Instead the inversion, which is required for the feedback-loop to function properly, is implemented as a part of the charge/discharge circuit 1.

Referring now to FIG. 3, a schematic diagram of an optical transient sensor semiconductor circuit according to the invention with a specific implementation of the charge/discharge circuit 1 and the inverting amplifier is shown. The charge/discharge circuit 1 comprises an N-channel MOS transistor Q4 and a P-Channel MOS transistor Q5. The gate of the N-Channel MOS transistor Q4 and the gate of the P-Channel MOS transistor Q5 are connected to node 2, the output of the amplifier. The source of the N-Channel MOS transistor Q4 and the source of the P-Channel MOS transistor Q5 are connected to node 6, the gate of the N-channel MOS feedback transistor Q1. In a preferred embodiment of the invention the well of the P-Channel MOS transistor Q5 is also connected to node 6. This causes the P-Channel MOS transistor Q5 to respond to a smaller source to gate voltage difference. The drain of N-Channel MOS transistor Q4 is connected to node 3, the signal output for low-high transitions. The drain of P-Channel MOS transistor Q5 is connected to node 4, the signal output for high-low transitions.

The inverting amplifier is implemented using an N-Channel MOS amplifier transistor Q2 and a P-Channel MOS amplifier transistor Q3. The gate of the N-Channel MOS amplifier transistor Q2 is connected to the n-region of photodiode D1. The source of the N-Channel MOS amplifier transistor Q2 in connected to a source of said second potential 8, shown as a ground potential in FIG. 3. The drain of the N-Channel MOS amplifier transistor Q2 is connected to node 2. The drain of the P-Channel amplifier transistor Q3 is also connected to node 2. Node 2 is connected to the input of the charge/discharge circuit 1. The source of the P-Channel MOS amplifier transistor Q3 is connected to a source of first potential 7. The gate of the P-Channel amplifier transistor Q3 is connected to bias voltage source $V_b$.

The inverting amplifier can also be implemented with a N-Channel MOS cascode transistor connected between the N-Channel MOS amplifier transistor Q2 and P-Channel MOS amplifier transistor Q3. This embodiment is not shown.

The circuit shown in FIG. 3 has built-in thresholds for a signal output response. For a response the charge- or discharge-currents must be higher than the leakage currents. In a typical implementation of the circuit the thresholds are asymmetric. If these built-in thresholds are not sufficient for the targeted application they can be adapted by adding additional circuit elements, in particular a transistor, as known to those of ordinary skill in the art.

Referring now to FIG. 4, a schematic diagram of an optical transient sensor semiconductor circuit according to the invention as shown. The circuit is identical to that of FIG. 3, except that it is extended by a current-to-voltage converter at each of the charge/discharge signal outputs 3, 4. The current-to-voltage conversion is implemented as follows. The gate and the drain of a P-Channel MOS conversion transistor Q6 are connected to the drain of the N-Channel MOS transistor Q4. The source of the P-Channel MOS conversion transistor Q6 is connected to a source of said first potential 7. The gate and the drain of an N-Channel MOS conversion transistor Q7 are connected to the drain of the P-Channel MOS transistor Q5. The source of the N-Channel MOS conversion transistor Q7 is connected to a source of said second potential 8, shown as a ground potential in FIG. 4. The output signal 3 for low-high transitions is provided at the gate of the P-Channel MOS conversion transistor Q6. The output signal 4 for high-low transitions is provided at the gate of the N-Channel MOS conversion transistor Q7.

Referring now to FIG. 5, a schematic diagram of an optical transient sensor semiconductor circuit with a charge/discharge circuit 1 with two stages is shown. A first stage comprises the charge/discharge transistors and a second stage is a transient gain stage 11. The transient gain stage 11 comprises a resistive element 10, a second capacitor C2 and in particular a third capacitor C3. The resistive element 10 is not necessarily a linear element. Specific implementations of the resistive element 10 are described in U.S. Pat. No. 5,376,813 using the term "adaptive element". The resistive element 10 is connected between the gate of N-Channel MOS feedback transistor Q1 and the common source of MOS charge/discharge transistors Q4, Q5. The second capacitor C2 is connected between said common source of MOS charge/discharge transistors Q4, Q5 and a source of a constant potential, in particular ground. The third capacitor C3 is connected in parallel to the resistive element 10. The first capacitor C1 and the third capacitor C3 form together a capacitive voltage divider. When $V_{amp}$ is higher than the voltage at the gate of N-Channel MOS feedback transistor Q1 the capacitors C2 and C1 are both charged. The resistive element 10 causes a delay in the charging of the first capacitor C1. The second capacitor C2 can be seen as an additional memory integrated in the charge/discharge circuit. For certain applications the second capacitor C2 can be chosen very small or be omitted completely. The same applies for the third capacitor C3. For certain applications the third capacitor C3 can be chosen very small or be omitted completely. The transient gain stage 11 causes the sensor to be more responsive to fast transients of the light intensity, while slow transients are adapted without response. This behavior is favorable for the detection of edges of moving objects.

Referring now to FIG. 6, a schematic diagram of a possible implementation of the charge/discharge circuit 1 in BiCMOS technology is shown. The circuit is identical to that shown in FIG. 3, except that the transistor Q4 is an NPN-transistor. This implementation has the advantage that the response of the transistor Q4 is independent of the absolute values of the voltages at nodes 2 and 6.

Referring now to FIG. 7, a schematic diagrams of a possible implementation of the charge/discharge circuit 1 in bipolar technology is shown. The circuit is identical to that shown in FIG. 3, except that the transistor Q4 is an NPN transistor and the transistor Q5 is a PNP-transistor.

Referring now to FIG. 8, a schematic diagram of a possible implementation of the charge/discharge circuit 1 is shown. The circuit is identical to that of FIG. 3, except that there is a capacitor C4 connected between the input and the main output of the charge/discharge-circuit. The capacitor C4 causes the circuit to be less responsive. It also reduces the magnitude of $V_{amp}$. It has preferably a capacitance which is much smaller than the capacitance of C1.

The present invention integrates all its functions in a single feedback loop. This results in a compact design that is suitable for monolithic high-resolution 1D or medium resolution 2D focal plane imaging arrays. Such arrays may be used to sense local brightness changes of an image projected onto the circuit plane. The arrays can be used in particular for recognition of moving objects, wherein moving objects usually correspond to local brightness changes. Compared to conventional sensors, the sensor according to the invention has the advantage of providing separate rectified low-high and high-low transient channels, without being expensive in transistor count. The rectified transient channels are particularly suitable for event-driven, asynchronous readout. Combinations of different output channels may also be used as inputs to modular data processing systems. The separation of the two output channels has also the advantage, that, in the steady state the output has a defined potential or current, in particular null. In systems with combined differential outputs the steady state usually corresponds to a gray value, which is difficult to define. Furthermore the output current null in the steady state has the advantage of a low power consumption in the steady state.

A further decrease of power consumption can be achieved by temporarily switching off the charge/discharge circuit, for example by disconnecting the signal current outputs.

Compared to the adaptive photoreceptors of U.S. Pat. No. 5,376,813 the sensor according to the invention has the advantage that the output corresponds substantially to the actual temporal derivative of the sensed light intensity. The response to a step in the light intensity is therefore a spike and not an overshoot with slow decay as provided by the sensors of U.S. Pat. No. 5,376,813.

The invention can be implemented in a camera that senses changes in the image. Such cameras could be useful for security and intrusion detection systems and for high-bandwidth data recording and transmission for temporally correlated data, as found in most imaging applications. For data transmission such techniques are already used in video compression algorithms, where only the changes in the images are transmitted. The sensor according to the invention allows such a compression already at the data recording stage. Furthermore, the invention can be used as a front-end of visual data processing systems in applications, where low-power consumption, small size and real-time performance are required, such as in autonomous mobile systems.

While there are shown and described presently preferred embodiments of the invention, it is to be distinctly understood that the invention is not limited thereto but may be otherwise variously embodied and practiced within the scope of the following claims.

What is claimed is:

1. An optical transient sensor circuit disposed in a semiconductor body comprising:

a feedback transistor of a first conductivity type, having a first source-drain region connected to a source of a first voltage potential, a gate and a second source-drain region;

a photodiode having a first terminal connected to said second source-drain region of said feedback transistor and a second terminal connected to a source of a second voltage potential, said photodiode oriented so as to be reversed biased with respect to said sources of first and second voltage potential;

an amplifier having an input connected to said first terminal of said photodiode and an output connected to an output node;

a charge/discharge circuit having an input connected to said output node, a main output connected to the gate of said feedback transistor and at least one signal output for a signal indicative of transitions;

a first capacitor having a first plate connected to said main output of said charge/discharge circuit and a second plate connected to a constant voltage potential.

2. The optical transient sensor circuit of claim 1, wherein the charge/discharge circuit comprises a first signal output for a signal indicative of low-high transitions and/or a second signal output for a signal indicative of high low transitions.

3. The optical transient sensor circuit of claim 1, wherein the charge/discharge circuit comprises:
   a first charge/discharge transistor having a gate, a first source-drain region, a second source-drain region and a conductivity type, wherein the first source-drain region of said first charge/discharge transistor is connected to a first signal output node and the second source drain region of said first charge/discharge transistor is connected to the gate of said feedback transistor and the gate of said first charge/discharge transistor is connected to the output of said amplifier;
   a second charge/discharge transistor having a gate, a first source-drain region, a second source-drain region and a conductivity type, wherein the conductivity type of the second charge/discharge transistor is opposite to the conductivity type of said first charge/discharge transistor and the first source-drain region of said second charge/discharge transistor is connected to the gate of said feedback transistor and the second source-drain region of said second charge/discharge transistor is connected to a second signal output node and the gate of said second charge/discharge transistor is connected to the output of said amplifier.

4. The optical transient sensor circuit of claim 3, wherein said second transistor has a well connected to the gate of said feedback transistor.

5. The optical transient sensor circuit of claim 1, wherein the amplifier is an inverting amplifier and the charge/discharge circuit is not inverting.

6. The optical transient sensor circuit of claim 1, wherein the amplifier is a non-inverting amplifier and the charge/discharge circuit is inverting.

7. The optical transient sensor circuit of claim 5, wherein said inverting amplifier comprises:
   a first amplifier transistor of said first conductivity type having a source, a gate and a drain, wherein the gate of said first amplifier transistor is connected to said first terminal of said photodiode and the source of said first amplifier transistor is connected to said source of a second voltage potential;
   a second amplifier transistor of a second conductivity type having a source, a gate and a drain, wherein the drain of said second amplifier transistor is connected to the drain of said first amplifier transistor and the gate of said second amplifier transistor is connected to a source of a bias potential and the source of said second amplifier transistor is connected to a source of said first voltage potential.

8. The optical transient sensor circuit of claim 1, wherein the charge/discharge circuit comprises at least two stages.

9. The optical transient sensor circuit of claim 8, wherein the charge/discharge circuit comprises:
   a first charge/discharge transistor having a gate, a first source-drain region a second source-drain region and a conductivity type, wherein the gate of said first charge/discharge transistor is connected to the output of said amplifier and the first source drain region of said first charge/discharge transistor is connected to a first signal output node;
   a second charge/discharge transistor having a gate, a first source drain region a second source drain region and a conductivity type, wherein the conductivity type of the second charge/discharge transistor is opposite to tho conductivity type or said first charge/discharge transistor, and wherein the gate of said second charge/discharge transistor is connected to the output of said amplifier, the first source drain region of said second charge/discharge transistor is connected to the second source drain region of said first charge/discharge transistor and the second source-drain region of said second charge/discharge transistor is connected to a second signal output node;
   a resistive element connected between the gate of said feedback transistor and the second source-drain region of said first charge/discharge transistor.

10. The optical transient sensor circuit of claim 9, wherein said charge/discharge circuit comprises a second capacitor, connected between the source of a constant potential, in particular ground, and the second source-drain region of said first charge/discharge transistor.

11. The optical transient sensor circuit of claim 9, wherein said charge/discharge circuit comprises a third capacitor, connected in parallel with said resistive element.

12. The optical transient sensor circuit of claim 9, wherein said resistive element is a non linear element.

13. The optical transient sensor circuit of claim 1, wherein said at least one signal outputs are current outputs.

14. The optical transient sensor circuit of claim 1, wherein said at least one signal outputs are voltage outputs.

15. The optical transient sensor circuit of claim 14, further comprising at least one current to voltage conversion circuit for providing said voltage outputs.

16. The optical transient sensor circuit of claim 15, wherein each of said at least one current-to-voltage conversion circuits comprises a converting transistor having a gate, a first source-drain region and a second source-drain region, wherein the first source drain region and the gate of said converting transistor are connected to one of the at least one signal outputs and the other source-drain region of the converting transistor is connected to a source of a constant voltage potential.

17. The optical transient sensor circuit of claim 1, wherein the circuit is implemented in BiCMOS technology.

18. The optical transient sensor circuit of claim 3, wherein said first charge/discharge transistor is an NPN transistor and said second charge/discharge transistor is a P-Channel CMOS transistor.

19. The optical transient sensor circuit of claim 1 further comprising a capacitor connected between the input and the main output of said charge/discharge circuit.

20. An optical transient sensor comprising:
   a feedback transistor;
   a light sensitive element connected in series with said feedback transistor;
   an amplifier having an input connected to an input node between said feedback transistor and said light sensitive element and having an output connected to an output node;
   a charge/discharge circuit having an input connected to said output node, a main output connected to a capacitive load and a gate of said feedback transistor and at least one output indicative of a current for charging or discharging said capacitive load.

* * * * *